United States Patent [19]

Ford, Sr.

[11] Patent Number: 5,778,763
[45] Date of Patent: Jul. 14, 1998

| [54] | APPARATUS AND PROCESS FOR TREATING BOTTLED LIQUOR |
|---|---|
| [76] | Inventor: Clifton K. Ford, Sr., 2604 Antrim St., Pearland, Tex. 77581 |
| [21] | Appl. No.: 751,874 |
| [22] | Filed: Nov. 18, 1996 |
| [51] | Int. Cl.$^6$ .................. C12H 1/00; B01F 3/04 |
| [52] | U.S. Cl. .......... 99/277.2; 99/277.1; 99/323.1; 99/472; 141/65; 426/474 |
| [58] | Field of Search .............. 99/277.1, 278, 99/323.1, 472, 277.2; 141/64, 65; 53/510; 426/474 |

[56] References Cited

U.S. PATENT DOCUMENTS

| 35,900 | 7/1862 | Speed et al. |
| 96,201 | 10/1869 | Clark . |
| 172,283 | 1/1876 | Sweet . |
| 246,294 | 8/1881 | Cushing et al. |
| 343,973 | 6/1886 | Wehrle . |
| 433,131 | 7/1890 | Malter . |
| 604,996 | 5/1898 | Maiche . |
| 2,117,604 | 5/1938 | Fessler et al. |
| 3,420,674 | 1/1969 | McCartney . |
| 4,512,251 | 4/1985 | Green . |
| 4,552,286 | 11/1985 | Kuckens et al. .......... 99/323.1 X |
| 4,785,724 | 11/1988 | Vassallo ................... 99/323.1 |
| 5,485,779 | 1/1996 | Evans et al. ............. 99/472 X |
| 5,566,730 | 10/1996 | Liebmann, Jr. .............. 141/64 |

*Primary Examiner*—Reginald L. Alexander
*Attorney, Agent, or Firm*—Pravel, Hewitt, Kimball & Krieger

[57] ABSTRACT

An apparatus and process are provided for improving the flavor of a bottle of liquor. An adapter seals the bottle, and an air inlet tube extends from the atmosphere through the adapter into the liquor in the bottle. A vacuum pump connected to the bottle draws air from the atmosphere through the air inlet tube into the liquor. The air percolates bubbles up through the liquor and is exhausted through the vacuum pump. Volatile compounds are drawn out of the liquor as a result of this action and discharged with the air, improving the flavor of the liquor.

16 Claims, 2 Drawing Sheets

APPARATUS AND PROCESS FOR TREATING BOTTLED LIQUOR

BACKGROUND OF THE INVENTION

1. Field of the Invention

This invention pertains to an apparatus and process of treating a bottled liquor to improve its taste or flavor.

2. Description of the related Art

It has long been known that certain components of distilled liquors which are residues of the fermentation process can cause the liquor to have an undesirable aftertaste or bitter flavor. The undesirable elements are known as volatiles, and include fusel oils and other undesirable compositions. Attempts have been made as part of the production process of liquor distillation to remove some of these undesirable components. U.S. Pat. Nos. 35,900 and 96,201 are representative of treatment of liquor during its initial production in an effort to remove the unpleasantly tasting residues. Often, however, purchasers may desire further treatment of the liquor to enhance the flavor once they have bought a bottle of the liquor at a store. So far as is known, there has been no readily available way to accomplish this.

U.S. Pat. No. 4,512,251 relates to breathing and degassing of wine. The air space in a bottle of wine was subjected to a reduced pressure. Although this apparently removed some of the residues or volatiles to make the wine more palatable, care was specifically taken to prevent air contact with the wine in the bottle, through the presence of an evacuated space in the bottle. This was done to prevent oxygen and bacteria in the air from causing spoilage of the taste of the wine.

SUMMARY OF THE INVENTION

The present invention provides an apparatus and a process for improving the flavor of bottled distilled alcoholic beverages or liquor. A bottle to be treated is first sealed by an adapter attached to the mouth of the bottle. An air inlet tube connected to the adapter is open to the atmosphere so that air passes through the adapter and into the liquor in the bottle. A vacuum pump draws a vacuum on the air space above the liquor within the bottle, drawing air rapidly through the liquor. The undesirable volatiles in the liquor are drawn out of the bottle through the adapter and into the vacuum pump and then vented or exhausted. The present invention thus allows individuals to improve the flavor of liquor after it has initially been bottled and sold. This can be done relatively easily and without complex distillation apparatus or heat sources.

BRIEF DESCRIPTION OF THE DRAWINGS

A better understanding of the present invention can be obtained when the following detailed description of the preferred embodiment is considered in conjunction with the following drawings, in which.

DETAILED DESCRIPTION OF THE PREFERRED EMBODIMENT

Figure 1:
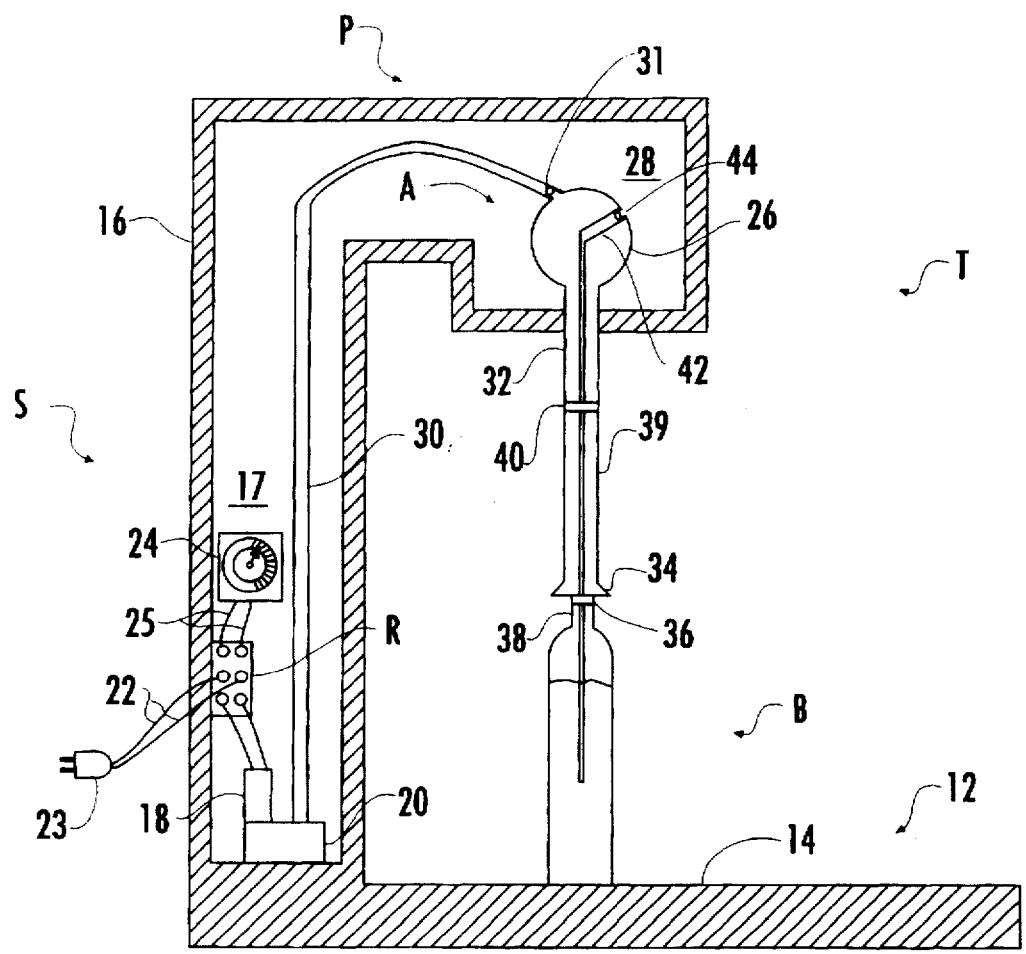
FIG. 1 is an elevation view, taken partially in cross-section, of a liquor treating apparatus according to the present invention.

With reference to the drawings, a liquor treating apparatus T according to the present invention for treating liquor contained in a bottle B is shown. As will be set forth, the treating apparatus T treats the liquor to remove undesirable volatiles such as fisel oils from the liquor which otherwise give an undesirable bitter taste to it. It has also been suggested that removal of such volatiles may lessen the possibility of hangover or nausea resulting from overconsumption. The present invention is adapted to treat various kinds of distilled liquors, such as whiskey, bourbon, scotch, rum, brandy, cognac, liqueurs, vodka, gin and the like.

The apparatus T includes a container stand S having a base member 12 on which is formed a support surface 14 on which the bottle to be treated is placed. The stand S may be formed of metal, synthetic resin or plastic or other material of suitable strength. A housing 16 preferably integrally formed with the base member 12 extends upwardly from support surface 14. The housing 16 serves as a receptacle or outer covering having an inner open area 17 for a vacuum pump 20. The pump 20 is an electrically driven one and receives electrical power through a power cord 22. If the power is from a conventional alternating current source, cord 22 is provided with a connector 23 for input from a wall socket or other source of electricity. The power for operating the pump 20 may be provided by batteries if a portable unit is desired. Although the pump is shown as a selfcontained electrically driven unit, it should be understood that a pump and separate motor may be used, as well.

Preferably, a timer 24 is provided for pump control purposes. Timer 24 is connected by conductors 25 to the pump 20. An on-off control switch or control relay R separate from timer 24 allows an operator or user to turn the treating apparatus T on and off, while the timer 24 itself allows a user to select a desired amount of operating time for the apparatus 10. It should be understood that in some situations where time control is not needed, the control relay R is used as an on-off electrical switch without need for a timer 24.

The container stand S also includes an upper body portion P extending outwardly from housing 16 above the base 12. The upper body portion P is preferably integrally formed with housing 16 and of like material. An adapter A of the apparatus T is mounted in an interior space 28 of the upper body portion P at a position beneath which the bottle B is placed. The space 28 in upper body portion P is in communication with the area 17 within the housing 16.

The adapter A is typically of a suitable plastic or plexiglass and may be of any suitable shape, such as spherical, cylindrical, box- shaped, rectangular or the like. The adapter A shown in FIG. 1 includes a generally bulb-shaped vacuum chamber 26 located in the space 28 within the upper body portion P. An outlet or exhaust tubing 30 connects at an upper end to an outlet 31 formed in a wall of the vacuum chamber 26. The outlet tubing 30 connects at a lower or opposite end to the vacuum pump 20.

Figure 1A:
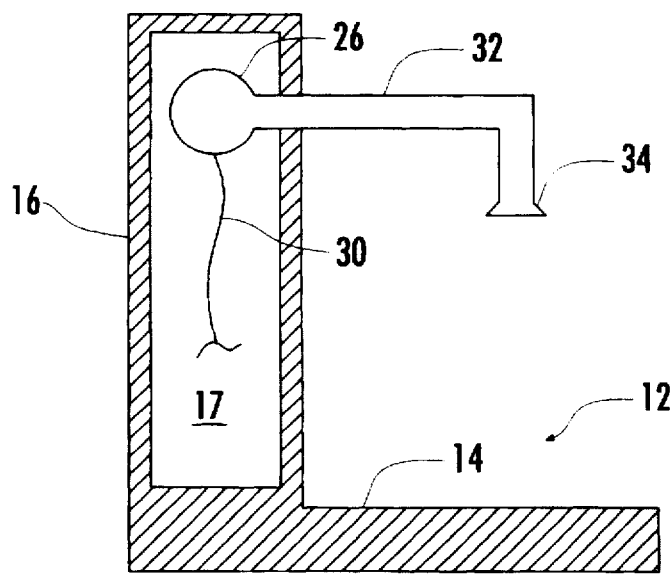
FIG. 1A is an elevation view, taken partially in cross-section, of an alternative embodiment of the liquor treating apparatus according to the present invention.
Figure 2:
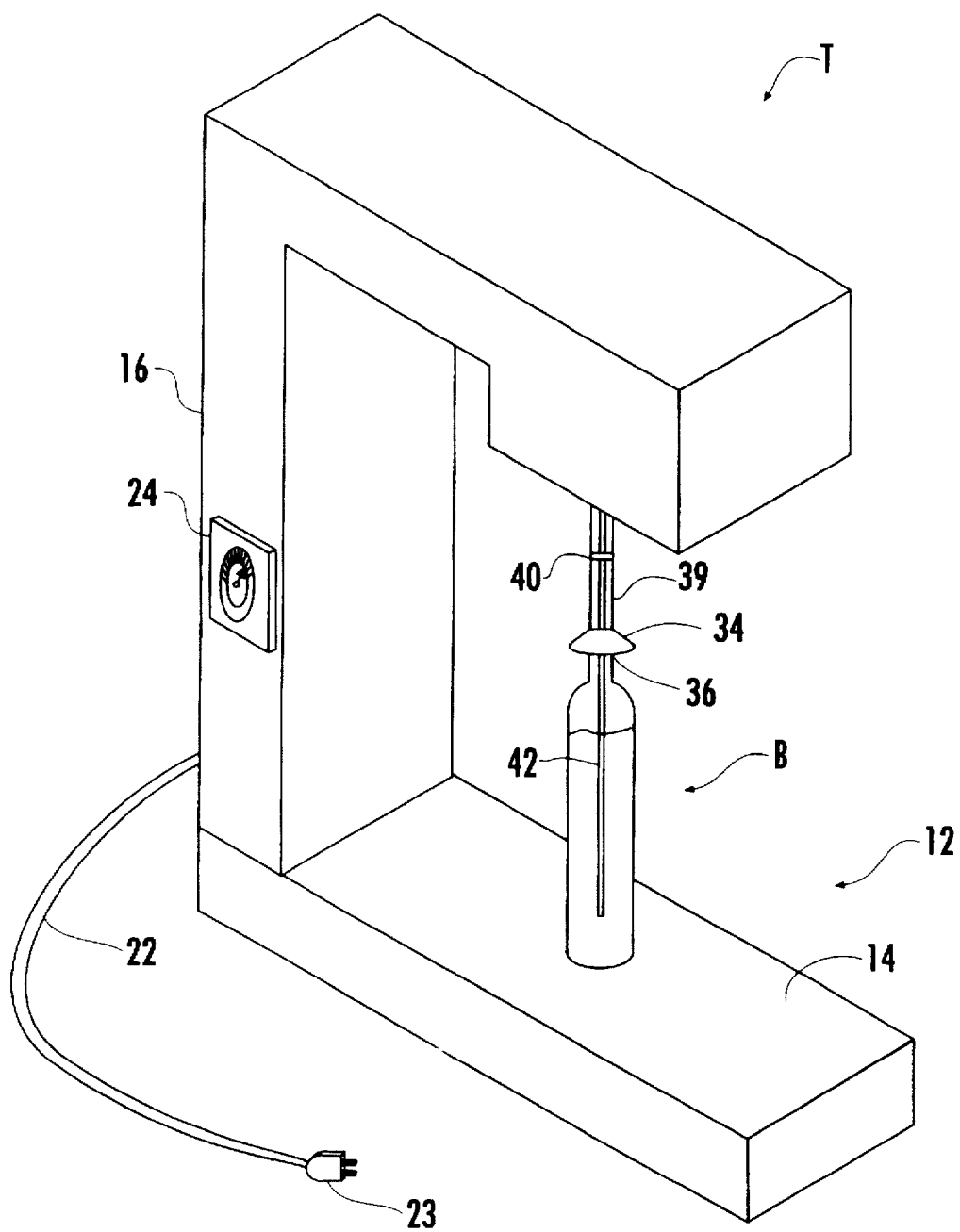
FIG. 2 is an isometric view of the liquor-treating apparatus of FIG. 1.

As shown in FIG. 1A, the adapter A may be located in area 17 within housing 16, and the apparatus 10 would thus not require an upper body portion P. The remaining structure shown in FIG. 1A corresponds and functions in a like manner to that shown in FIG. 1 and thus bears like reference numerals.

A tubular outlet passage 32 of the adapter A is formed extending downwardly from the chamber 26 through a lower wall of upper body portion P of the stand S. The outlet passage 32 has a flared lower end 34 which is adapted to fit over and form a seal with a mouth 36 at an upper end of a neck 38 of bottle B. If desired, a sealing gasket may be included in the lower end 34 to engage and seal with the bottle mouth 36. In some situations, the outlet passage 32 may be formed in part by an extension 39 connected to vacuum chamber 26 by a clamp, as indicated at 40.

The adapter A also includes an air inlet tube 42 mounted within it extending from an air inlet port 44 formed in the chamber 26 downwardly through chamber 26 and outlet passage 32. The air inlet tube is of a suitable length to extend into the bottle B adjacent or slightly above the support surface 14 of the base 12. Air inlet tubing 42 is sealed from the interior of the chamber 26 and outlet passage 32.

The air inlet tube 42 may be of some flexible material mounted within the interior of the vacuum chamber 26 in communication with the atmosphere through the vacuum chamber wall, as shown in the drawings. Alternatively, the air inlet tube 42 may be integrally formed with the vacuum chamber 26 and be provided with a flexible extension hose or tube at its lower end for ease of insertion into the neck 38 of the bottle B. In either situation, the air inlet tube 42 receives air at atmospheric pressure and draws it into the liquor in the bottle B because of reduced pressure or vacuum conditions in the chamber 26.

To operate the liquor-treating apparatus 10, an operator or user places the bottle B on the support surface 14 after it has been opened and inserts the air inlet tubing 42 into the bottle. The bottle mouth 36 is then sealed with lower end 34 of outlet passage 32. Outlet passage 32 is in fluid communication with vacuum pump 20 through vacuum chamber 26 and outlet passage 32. The operator activates vacuum pump 20 by turning timer 24 to a desired setting. It has been found that a setting of about fifteen minutes works well for most bottled liquors. With vacuum pump 20 activated, a vacuum is created in vacuum chamber 26, providing a vacuum inside bottle B. Due to this vacuum inside the bottle, air is drawn into air inlet tubing 42 through inlet port 44. Air discharges through end 42 and vigorously bubbles up through the liquor in the bottle B.

Volatile compounds which would otherwise impart an undesirable bitter flavor or side affecting the liquor are carried off with the air into vacuum pump passing through outlet passage 32, vacuum chamber 26, and outlet tubing 30. The air and volatile compounds are discharged from a vent or outlet of vacuum pump 20. After the apparatus T has run for the selected period of time for which timer 24 was set, timer 22 deactivates the apparatus T. With the present invention, it has been found that the flavor of the liquor in bottle 28 is improved by this treatment.

It is to be noted that the liquor being treated for removal of volatiles by the present invention never leaves the bottle B during the treatment process thus, an individual or user may treat liquor in the bottle after purchase. The present invention thus lends itself to use in one's home or by owners or bartenders at taverns or lounges. After treatment, the liquor in the bottle does not revert back to a condition of bitter taste, since the volatiles are removed. Further, treatment according to the present invention does not significantly change the volume of liquor in the bottle, or its alcohol content. There is, however, a noticeable difference in the aroma of most liquor after treatment, and the treated liquor has a smoother, better taste.

It should be understood that various other alternate forms of adapters can be used to connect vacuum pump 20 and bottle B for use in the present invention. For example, a stopper of some resilient material located inside mouth 36 of bottle neck 38 could be provided with has two tubes passing through it. A first one of the tubes would be exposed to atmosphere at an upper end for drawing air in and extend into bottle B like tubing 42. The other adapter tube provided would extend from vacuum pump 20 through the stopper and into fluid communication with the air space above the liquor within bottle B in the manner of outlet passage 32. In this manner the bulb-shaped vacuum chamber 26 would not be required. The bottle B would of itself serve as a vacuum chamber. Numerous configurations are also available for applying a vacuum to bottle 28 for drawing air into a lower portion of bottle 28 so that air bubbles up through the liquor.

Having described the invention above, various modifications of the techniques, procedures, material and equipment will be apparent to those in the art. It is intended that all such variations within the scope and spirit of the appended claims be embraced thereby.

I claim:

1. An apparatus for treating bottled liquor to remove volatiles from the liquor which impair its taste, comprising:

an adapter for insertion into a mouth of the bottle to block the bottle mouth;

an air inlet tube passing through the adapter from an air inlet open to the atmosphere and extending into the bottle to an outlet in a lower portion of the bottle;

said adapter having an outlet passage communicating with the bottle sealed from the atmosphere when said adapter is inserted into the bottle mouth;

a vacuum pump in fluid communication through said adapter outlet passage with the bottle for air to be drawn from the atmosphere through said air inlet tube and into the liquor in the bottle;

said vacuum pump further causing the air to rise through the bottle and remove the liquor volatiles through said adapter outlet passage into said vacuum pump.

2. The apparatus of claim 1, further comprising a motor for driving the vacuum pump.

3. The apparatus of claim 2, further comprising a timer for controlling the operating time of said vacuum pump.

4. The apparatus of claim 1, further comprising a container stand having a support surface for receiving the bottle and housing for containing said vacuum pump.

5. The apparatus of claim 4, wherein said housing further contains said motor.

6. The apparatus of claim 4, wherein said housing extends upwardly from said support surface.

7. The apparatus of claim 6, wherein said container stand further includes an upper body portion extending from said housing above said support surface for receiving said adapter therein.

8. A process for improving the flavor of a bottled liquor, comprising:

connecting an adapter to a bottle containing the liquor, so that an air inlet tube of the adapter extends from the atmosphere into the liquor bottle;

drawing a vacuum in the bottle with a vacuum source in fluid communication with the bottle;

drawing air into the bottle through the air inlet tube with the vacuum;

allowing the air to percolate through the liquor within the bottle; and exhausting the air through the vacuum source, wherein volatile compounds are removed from the liquor and discharged with the air.

9. The process of claim 8, further including the step of controlling the time of drawing a vacuum in the bottle.

10. An apparatus for vacuum aeration of a liquor in a bottle to remove undesirable volatiles, comprising:

a vacuum source for drawing a vacuum on the bottle of liquor;

a pathway for providing fluid communication between the vacuum source and the bottle of liquor;

a seal for sealing the bottle of liquor; and an air inlet tube extending from the atmosphere through the seal and into the liquor in the bottle said vacuum source draws air from the atmosphere through the liquor and out through the pathway to remove undesirable volatiles from the liquor.

11. The apparatus of claim 10, wherein the vacuum source is a vacuum pump.

12. The apparatus of claim 10, further comprising a motor for driving the vacuum source.

13. The apparatus of claim 12, further comprising a timer for operating said source pump a selected period of time.

14. The apparatus of claim 10, wherein said seal includes an outlet passage defining a vacuum chamber above the liquor in the bottle.

15. The apparatus of claim 14, wherein said air inlet tube extends through said outlet passage in said seal.

16. The apparatus of claim 10, further comprising a container stand having a base for receiving the liquor bottle and a housing holding said vacuum source.

* * * * *